No. 800,190. PATENTED SEPT. 26, 1905.
D. O. WARD.
SELF LOCKING NUT.
APPLICATION FILED NOV. 28, 1904.
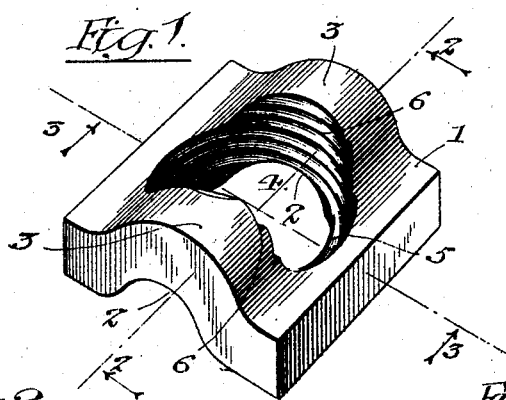
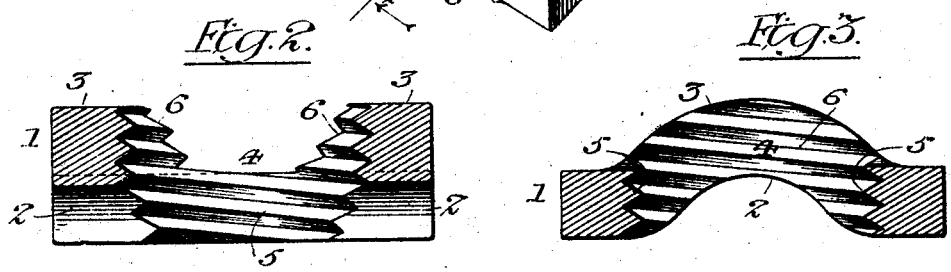
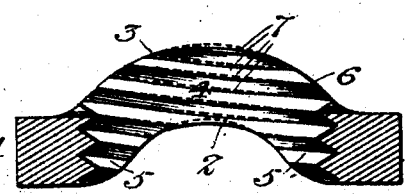
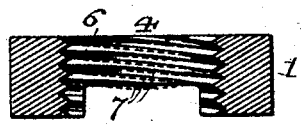
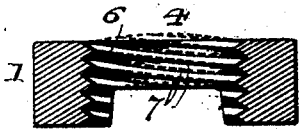
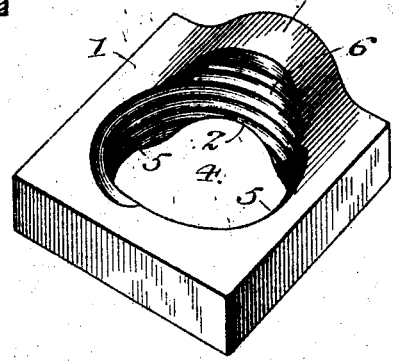
Witnesses:-
Louis H. F. Whitehead
Benton A. Hills
Inventor:
Daniel O. Ward
by:- John W. Hill
Atty:-

UNITED STATES PATENT OFFICE.

DANIEL O. WARD, OF OAK PARK, ILLINOIS, ASSIGNOR TO GRIP NUT COMPANY, OF CHICAGO, ILLINOIS, A CORPORATION OF ILLINOIS.

SELF-LOCKING NUT.

No. 800,190.     Specification of Letters Patent.     Patented Sept. 26, 1905.

Application filed November 28, 1904. Serial No. 234,463.

*To all whom it may concern:*

Be it known that I, DANIEL O. WARD, a citizen of the United States of America, residing at Oak Park, county of Cook, and State of Illinois, have invented certain new and useful Improvements in Self-Locking Nuts, of which the following is a description.

My invention relates to that class of nuts provided with means to prevent their accidental movement upon a bolt when in use.

The object of my invention is to produce a simple, durable, and efficient device of the kind described and one which may be repeatedly screwed down upon a bolt without damage to either the bolt or nut.

To this end my improvement consists in the novel construction and arrangement of parts herein shown and described, and more particularly pointed out in the claims.

In the accompanying drawings, wherein like or similar reference characters indicate like or corresponding parts, Figure 1 is a perspective view of the preferred form of my nut. Fig. 2 is a section taken on line 2 2 of Fig. 1. Fig. 3 is a section taken on line 3 3 of Fig. 1, showing a nut threaded and ready for the final deflecting. Fig. 4 is a section similar to that shown in Fig. 3, showing a portion of a completed nut ready for use. Fig. 5 is a perspective view of a modified form of my nut; and Figs. 6 and 7 are sections similar to that shown in Fig. 4, but showing modified forms of my device.

In the preferred form of my device shown in the drawings, 1 is a screw-threaded nut of the usual or any preferred form, provided with a groove 2 formed in one of its faces, and preferably with a ridge or projection 3 upon the opposite face, so that the thickness of the metal in the nut will be substantially uniform.

The groove 2 may be of any preferred form or arrangement, so that a part of the threaded portion of the nut upon opposite sides of the opening 4 is cut away, leaving a series of short or interrupted threads 5 5 upon opposite sides of the opening between the parts cut away.

Where a ridge 3 is formed upon one face of the nut, as above described, it is evident that a series of short or interrupted threads 6 6 will be formed upon the ridged side of the nut at substantially right angles to the short threads 5 5 upon the grooved side of the nut.

To cause the nut to lock when screwed upon a bolt, the threads 6 above the groove 2 are slightly deflected, as shown in Fig. 4, the dotted lines at 7 showing the original plane of the threads. This deflecting or bending of the threads at 6 6 may be accomplished in any preferred manner, and it is immaterial whether the threads be bent or deflected out of their normal plane toward or away from the groove 2 or whether the parts upon the opposite sides of the opening 4 are bent in the same direction, in this construction it being necessary that the deflection of the threads be made before the nut is applied to the bolt—in other words, are given a normal deflection—the object being to deflect a part of the threads out of their normal plane at one or more points, so that the threads upon the bolt coöperating with the nut will be gripped by the normal and deflected threads with sufficient friction to prevent any accidental movement between the nut and bolt.

The principal function of the groove 2 is to permit the normal threads to extend beyond the deflected portion, so that the nut may be readily started upon the bolt. By this arrangement the nut will move freely until the deflected part is reached, when there is a sufficient engagement between the bolt and the short normal threads to permit of the convenient use of a wrench to further tighten the nut.

In Fig. 5 a nut is shown with the groove 2 and ridge 3 at one side only of the opening 4; but obviously the operation is in all respects similar to that where the groove and ridge extend upon both sides. In some cases where it is intended that a nut is to be frequently adjusted it is evident that the deflected portion of the threads may become worn and gradually lose its locking effect. Under such circumstances, if desired, the threads at one side of the opening only may be deflected, the opposite side being left normal until such time as it is thought desirable, when the nut may be removed from the bolt and the normal side deflected, which would restore the original locking properties to the nut.

Having thus described my improvement, it is obvious that various immaterial modifications may be made in my device without departing from the spirit of my invention. Hence I do not wish to be understood as limiting myself to the exact form and construction shown.

What I claim as new, and desire to secure by Letters Patent, is—

1. A device of the kind described, comprising a screw-threaded solid nut having its threads interrupted adjacent one of its faces and normally deflected from their regular plane longitudinally of the threaded opening along one or more lines extending therethrough.

2. A device of the kind described, comprising a screw-threaded solid nut having its threads interrupted adjacent one of its faces, and its threads deflected from their normal plane along one or more lines extending through said nut at said points of interruption.

3. A device of the kind described, comprising a screw-threaded nut, provided with one or more grooves formed in one face extending from the opening to the margin, the threads of said nut not interrupted by said grooves being deflected from their normal plane at any of said grooves.

4. A device of the kind described, comprising a screw-threaded nut provided with a groove in one face extending across the opening, and having its threads that are not interrupted by said groove permanently deflected from their normal plane at said groove.

5. A device of the kind described, comprising a screw-threaded nut provided with one or more grooves formed in one face extending from the opening to the margin, and corresponding ridges formed on the opposite face, the threads being permanently deflected from their normal plane at said grooves.

6. A device of the kind described, comprising a screw-threaded nut provided with a groove formed in one face extending across the opening, and a corresponding ridge formed in the opposite face, the threads of said nut being permanently deflected from their normal plane at said groove.

7. A device of the kind described, comprising a screw-threaded nut provided with a plurality of short threads formed upon substantially opposite sides of the opening and adjacent both faces of said nut, the short threads near one face being positioned at substantially right angles to the short threads near the opposite face, a part of said short threads at one face being deflected from their normal plane.

8. A metal nut, comprising a curved plate provided with a screw-threaded central orifice forming a combination of short and long threads, said plate after the screw-threads are cut being set to throw part of said threads slightly out of their normal plane, whereby a part of the threads are left in their normal planes to mount the bolt and certain other threads are set to partially impinge upon the bolt-threads.

9. A device of the kind described, comprising a screw-threaded nut provided with a combination of short and long threads, said long threads being formed upon the central portion of said nut, and said short threads being formed upon each side thereof, near each face of said nut, and upon opposite sides of the threaded opening, the short threads near one face of said nut being at substantially right angles to the short threads near the opposite face, the short threads near one face being slightly curved from their normal plane.

In testimony whereof I have hereunto signed my name in the presence of two subscribing witnesses.

DANIEL O. WARD.

Witnesses:
  ROY W. HILL,
  CHARLES I. COBB.